June 25, 1929.  H. L. PELZER  1,718,375
ART OF CRACKING HYDROCARBON OILS
Filed April 11, 1928
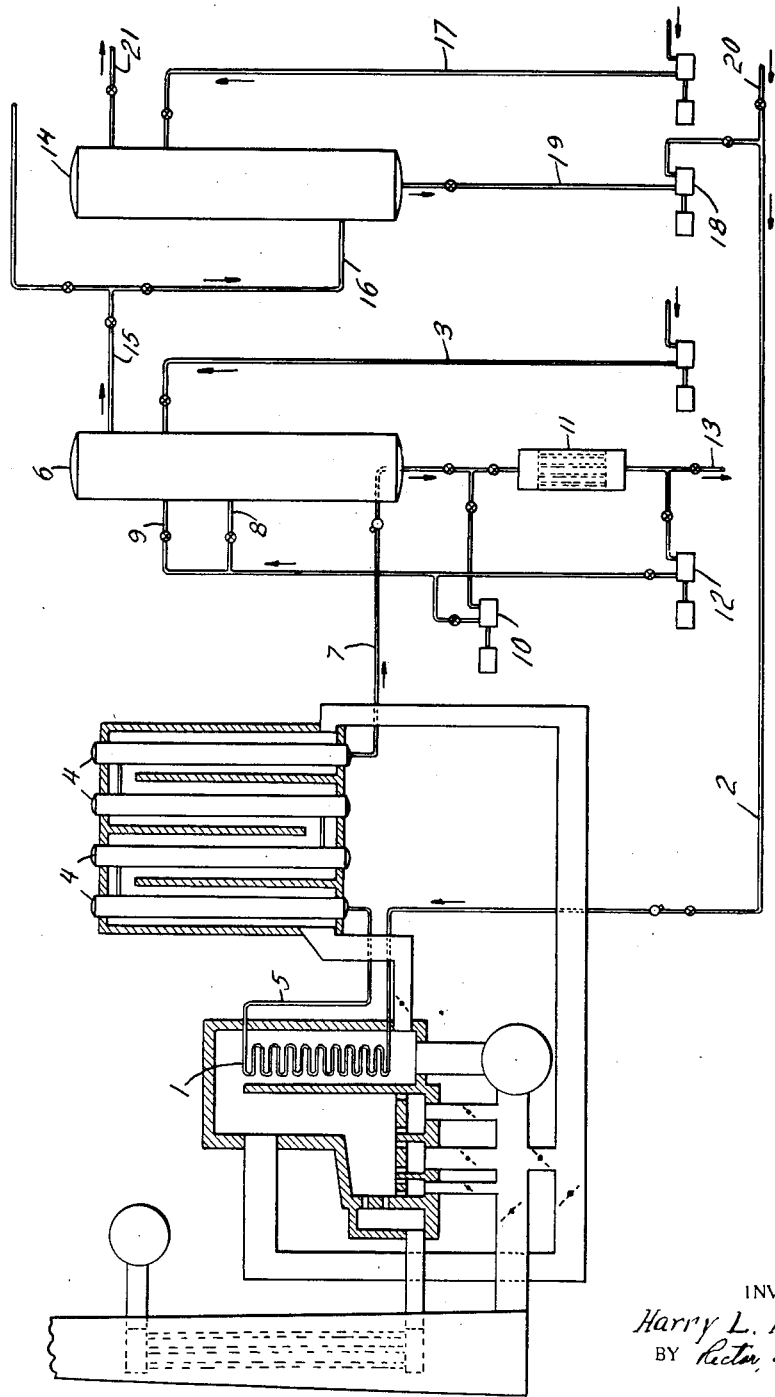
INVENTOR
Harry L. Pelzer
BY Rector, Hibben Davis
Macauley
ATTORNEYS Patented June 25, 1929.

1,718,375

UNITED STATES PATENT OFFICE.

HARRY L. PELZER, OF HIGHLAND, INDIANA, ASSIGNOR TO SINCLAIR REFINING COMPANY, OF NEW YORK, N. Y., A CORPORATION OF MAINE.

ART OF CRACKING HYDROCARBON OILS.

Application filed April 11, 1928. Serial No. 269,289.

This invention relates to improvements in the manufacture of gasoline from high-sulphur crude oil such as, for example, the high-sulphur crude petroleums now produced in west Texas and similar crude petroleums.

Certain crude petroleums, of which the above are examples, contain as much as $\frac{1}{2}\%$ or more of sulphur in form such that at elevated temperatures acidic compounds are formed by decomposition of sulphur compounds present. Such acidic compounds are objectionable as components of gasoline, for example, and further tend to cause severe corrosion of distillation apparatus, for example. Heavier distillates such as gas oil, for example, produced from such crude petroleums by the usual methods also usually include a relatively large amount of sulphur compounds objectionable in these respects.

This invention provides an improved method for producing gasoline or gasoline-containing distillates directly from such crude oil by a combination of cracking and refining operations in which the two cooperate to produce an improved product and to minimize corrosion.

According to the present invention, the hot oil products or vapor mixture from a vapor phase cracking operation are subjected to a scrubbing operation for the separation of tar and the high-sulphur crude oil is introduced into the vapors in this scrubbing operation after mixture with a caustic alkali such as quick lime or caustic soda. The vapor mixture escaping from the scrubbing operation is subjected to a refluxing operation for the the condensation of heavier vapors such as gas oil or kerosene components, this reflux condensate is supplied to the vapor phase cracking operation first mentioned, and the gasoline produced is taken off as the vapor mixture or as part of the vapor mixture escaping from the refluxing operation. This gasoline-containing vapor mixture may be subjected to any suitable or desired fractionating, refining or condensing operations. The tar separated in the scrubbing operation is discharged without being permitted to return to the vapor phase cracking operation as such.

In the vapor phase cracking operation, the oil supplied thereto is heated to a high cracking temperature, for example, 950–1150° F. or higher. The resulting vapor mixture including tar components produced in the cracking operation while still at high temperature, for example, upwards of 900° F., is introduced into the scrubbing operation. The high-sulphur crude oil, as it comes from the ground or after topping, mixed with caustic alkali, for example, one to two pounds or somewhat more of either quick lime or caustic soda per barrel of oil, is also introduced into this scrubbing operation. The crude oil-caustic alkali mixture is heated and oil components thereof vaporized by heat exchange with the hot vapor mixture from the cracking operation and at the same time the vapor mixture from the cracking operation is partially cooled, the crude oil or the unvaporized part of the crude oil together with components condensed from the vapor mixture also serving as a scrubbing medium. The vapor mixture escaping from the scrubbing operation thus includes the uncondensed components of the vapor mixture from the vapor phase cracking operation and the vaporized components of the crude oil introduced into the scrubbing operation. In the refluxing operation, this vapor mixture is partially condensed, heavier components being condensed and thus separated from lighter components suitable as components of the gasoline product, these lighter components escaping as a vapor mixture remaining uncondensed. The resulting reflux condensate includes heavy components vaporized from the crude oil introduced into the scrubbing operation and similar components of the vapor mixture from the vapor phase cracking operation. This reflux condensate is supplied to the vapor phase cracking operation to be cracked therein. The tar separated in the scrubbing operation includes tar components separated from the vapor mixture from the vapor phase cracking operation and similar components of the crude oil introduced into the scrubbing operation as well as any unconsumed caustic alkali and the solid or semi-solid reaction products of the caustic alkali.

The invention will be further described in connection with the accompanying drawings which illustrate, diagrammatically and conventionally, in elevation and partly in section and with parts broken away, one apparatus adapted for carrying out the process of the invention. The particular apparatus shown is shown merely for purposes of illustration.

The apparatus illustrated includes a vapor phase cracking apparatus described more in detail in my application filed June 13, 1927, Serial No. 198,621.

Referring to the drawings, the oil supplied to the vapor phase cracking operation is supplied to the heating conduit 1 through connection 2, is heated and vaporized and the vapors superheated in the heating conduit, the vapors are passed to the digesting drums 4 through connection 5 and from the last digesting drum are discharged into the lower end of the scrubbing tower 6 through connection 7. For example, the temperature of the vapors passing from the heating conduit 1 to the digesting drums 4 may approximate 1000–1100° F., the temperature of the vapors passing from the digesting drums 4 to the scrubbing tower 6 may approximate 950–1050° F., the oil may be supplied to the heating conduit 1 under pressure sufficient to force the oil and oil vapors through the apparatus, and the pressure in the scrubbing tower 6 may approximate 2–4 inches of mercury.

The high-sulphur crude oil is mixed with 1–2 pounds per barrel, for example, of quick lime or caustic soda and then, in carrying out the invention in the apparatus illustrated, is introduced into the upper end of the scrubbing tower 6 through connection 3. In the scrubbing tower 6 the introduced crude oil caustic alkali mixture is heated by heat exchange with the vapors from the vapor phase cracking operation and at the same time these vapors are subjected to the scrubbing action of the introduced crude oil. Lighter components of the introduced crude oil, for example, all components through the usual gas oil cut, are vaporized and heavier components of the vapor mixture from the vapor phase cracking operation are condensed or separated from the vapor mixture. The scrubbing operation carried out in this tower 6 may be controlled, for example, so that the temperature of the vapor mixture escaping from the upper end of the tower approximates 650–750° F. If the refluxing action of the introduced crude oil is insufficient to maintain the desired head temperature, a part of the tar separated in the tower may be reintroduced into the upper end of the tower through connections 8 or 9 while hot by means of pump 10 or after cooling in cooler 11 by means of pump 12. The tar separated in the scrubbing tower 6 includes the tar components of the vapor mixture from the vapor phase cracking operation and the tar components of the crude oil introduced through connection 3 and any unconsumed caustic alkali and the solid or semi-solid reaction products of the caustic alkali. This tar is discharged through connection 13 without being permitted to pass again, as such, through the heating conduit 1. The discharged tar may be subjected to coking distillation, for example, to separate oil components from alkali or alkali reaction products. The vapor mixture from the scrubbing tower 6, including the vaporized components of the introduced crude oil and the uncondensed components of the vapor mixture from the vapor phase cracking operation, escapes to the lower end of reflux tower 14 through connections 15 and 16. In the reflux tower 14 the heavier components of the vapor mixture including heavy components vaporized from the crude oil introduced into the scrubbing tower 6 and heavy components of the vapor mixture from the vapor phase cracking operation, are condensed. The refluxing operation carried out in this tower 14 may be controlled, for example, so that the temperature of the vapor mixture escaping from the upper end of the tower approximates 375–425° F. This refluxing may be effected by external cooling of the tower, by circulation of a cooling medium in indirect heat exchanging relation with the vapors in the tower or by introduction into the vapors in the tower of an oil refluxing medium, through connection 17 in the apparatus illustrated. A gasoline character fraction, for example, may be supplied through connection 17 to cool the vapors in the tower by vaporization or a clean gas oil stock, for example, may be supplied through connection 17 to cool the vapors in the tower by direct heat exchange. The condensate mixture from the reflux tower 14 is supplied to the heating conduit 1 of the vapor phase cracking apparatus by means of hot oil pump 18 through connections 19 and 2. This condensate mixture includes components of the crude oil introduced into the scrubbing tower 6 vaporized therein and condensed in the reflux tower 14 and components of the vapor mixture from the vapor phase cracking operation uncondensed in the scrubbing tower 6 but condensed in the reflux tower 14, together with the unvaporized components of any stock introduced into the reflux tower 14. Raw oil, for example, a clean kerosene character stock or a clean gas oil stock may also be supplied to the vapor phase cracking operation, with this condensate mixture, through connection 20. The vapor mixture escaping from the upper end of the reflux tower 14 through connection 21 includes the gasoline produced in the operation.

This gasoline-containing vapor mixture may be subjected to a fractionating operation to produce a finished gasoline product of the desired end boiling point, 410–420° F. for example, and it may be subjected to a vapor phase refining operation to produce a directly refined finished gasoline product, by passage through an adsorptive earth such as fuller's earth for example, as described in my prior application above identified.

The scrubbing tower 6 and the reflux tower 14 may be of conventional open baffle construction. The scrubbing tower 6 is with advantage lagged or thermally insulated. The reflux tower 14 is with advantage lagged or thermally insulated where, as in the apparatus illustrated, the refluxing is effected by internal cooling.

In carrying out the invention, the sulphur compounds or the most reactive sulphur compounds of the high-sulphur crude oil supplied to the operation react with or are decomposed by the caustic alkali supplied in admixture with this crude oil at the elevated temperatures maintained in the scrubbing operation into which the crude oil-caustic alkali mixture is introduced to form heavy components separated with the tar separated in and discharged from the scrubbing operation. The only part of this high-sulphur crude oil supplied to the vapor phase cracking operation is first vaporized in the scrubbing operation and then condensed in the refluxing operation, in effect undergoing a distillation in which the sulphur compounds or the most reactive sulphur compounds are left behind as a residue. The stock supplied to the vapor phase cracking operation is thus kept free of the more objectionable part of the sulphur content of the crude oil and of heavy components such as the caustic alkali itself or solid or semi-solid reaction products of the caustic alkali. Further, the vapor mixture from the vapor phase cracking operation is also subjected to the action of the caustic alkali at high temperature as this vapor mixture is discharged into the scrubbing operation. Sulphur compounds formed by decomposition in the vapor phase cracking operation which otherwise might escape to contaminate the gasoline product or might be returned to the vapor phase cracking operation with the condensate mixture from the refluxing operation are thus also separated with the tar separated in and discharged from the scrubbing operation.

I claim:

In the manufacture of gasoline from high-sulphur crude oil, the improvement which comprises subjecting oil to a vapor phase cracking operation and subjecting the vapor mixture from the said vapor phase cracking operation to a scrubbing operation for the separation of tar, mixing caustic alkali with the high-sulphur crude oil and introducing the caustic alkali-crude oil mixture into the vapors in the said scrubbing operation, subjecting the resulting vapor mixture escaping from the said scrubbing operation including the uncondensed components of the vapor mixture from the vapor phase cracking operation and the vaporized components of the crude oil introduced into the scrubbing operation to a refluxing operation, condensing in the said refluxing operation vapors heavier than suitable as components of the gasoline product including heavy components vaporized from the crude oil introduced into the scrubbing operation, supplying this reflux condensate from the said refluxing operation to the said vapor phase cracking operation, and discharging tar including tar components separated from the vapor mixture from the vapor phase cracking operation and from the crude oil introduced into the scrubbing operation and including any unconsumed caustic alkali and the solid or semi-solid reaction products of the caustic alkali from the said scrubbing operation without permitting this discharged tar to return to the said vapor phase cracking operation.

In testimony whereof, I have subscribed my name.

HARRY L. PELZER.